May 18, 1937.　　　　H. P. SANDERS　　　　2,080,791
ELECTRODE HOLDER
Filed Nov. 5, 1936
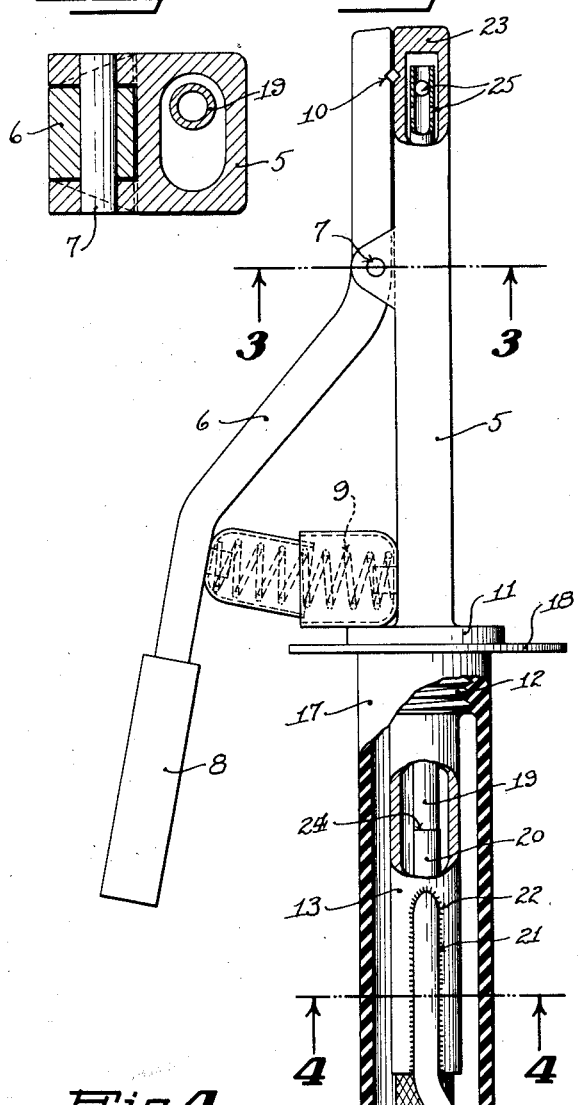
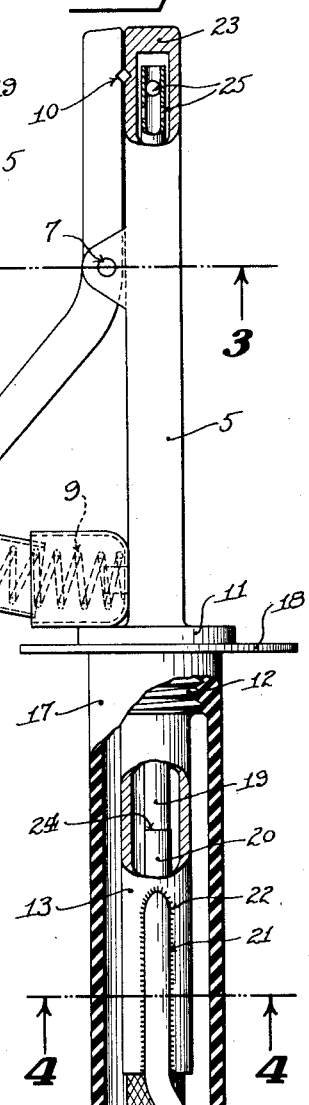
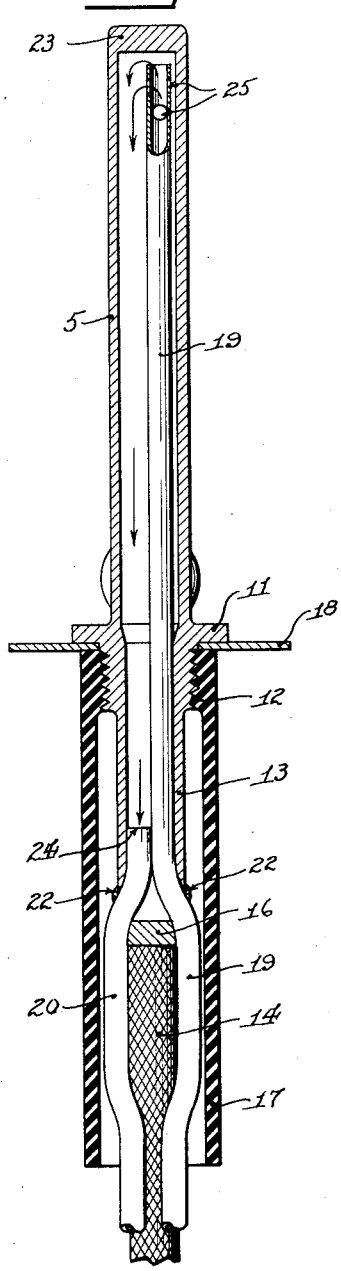
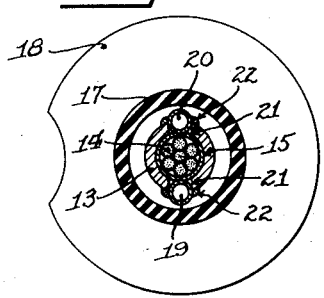
INVENTOR.
Harold P. Sanders
BY Barth & Barth
ATTORNEYS.

Patented May 18, 1937

2,080,791

UNITED STATES PATENT OFFICE 2,080,791

ELECTRODE HOLDER

Harold P. Sanders, El Paso, Tex.

Application November 5, 1936, Serial No. 109,256

3 Claims. (Cl. 219—8)

The present invention relates to holders for welding electrodes, and has for its principal object the provision of cooling means in the holder whereby the heat incident to welding is transmitted away from the holder with sufficient rapidity to prevent overheating thereof.

Another object is to provide cooling means of such form as not to interfere with the convenient use of the holder in welding operations. Other objects and advantages of the invention will become apparent from the following description, which should be read with the understanding that changes, within the limits of the claims hereto appended, may be made in the form, construction and arrangement of the several parts, without departing from the spirit of the invention as defined in said claims.

A preferred embodiment of the invention is illustrated in the accompanying drawing, in which Fig. 1 is a longitudinal part sectional elevation of the complete device.

Fig. 2 is a longitudinal section taken in a plane at right angles to the plane of Fig. 1.

Figs. 3 and 4 are transverse sections taken on the respective lines 3—3 and 4—4 of Fig. 1, Fig. 3 being enlarged.

In the drawing, the reference numeral 5 designates an elongated hollow body, having preferably a rectangular cross section for the greater portion of its length. The electrode (not shown) may be removably secured at the end of the body 5 in any desired manner, as for example, by a clamp 6, pivotally connected with said body at 7, and provided with a suitable insulated handle 8. A spring 9 keeps the clamp in the position shown, the electrode being gripped in notches 10 between the ends of the clamp and the body.

The body 5 has a flange 11, beyond which is a thread 12 and a cylindrical extension 13. The end of the electric conductor cable 14 is inserted into said extension and soldered as shown at 15 in Fig. 4. A plug 16, Fig. 2, serves as an abutment for the end of the cable. A tubular insulating handle 17 is screwed upon the thread 12, clamping an insulating collar 18 against the flange 11.

Two small diameter pipes or tubes 19 and 20, preferably copper, are led into the body extension 13 through slots 21 in its wall, and are welded in said slots as shown at 22 in Fig. 4. The outer ends of said tubes are slightly offset, as shown in Figs. 1 and 2, to lie adjacent to one side of the cable 14, and are adapted for connection with hoses, not shown, which may, if desired, be fastened to said cable. One tube, 19, extends the full length of the body 5, and terminates in an open end near the closed end 23 of said body. The other tube 20 terminates in an open end 24 within the tubular extension 13.

Suitable cooling fluid, for example water, is supplied to the tube 19, and issues from its open end, and from one or more additional orifices 25 near said open end, into the interior cavity of the body 5 in the hottest region near the electrode. The cooling fluid then flows back through the body and escapes through the tube 20. The plug 16, the solder 15 at the cable connection, and the welds 22 around the tubes 19 and 20 effectively seal the body against leakage of fluid. The arrangement of the tubes insures proper circulation of the cooling fluid, introducing it at one end of the body and causing it to flow the entire length thereof before escaping.

I claim:

1. An electrode holder comprising a tubular body of electrical conducting material having a closed end, means for removably holding an electrode in electrical contact with said body near said closed end, an electrical conductor inserted into the other end of said body, said conductor closing said other end and having electrical contact therewith, and a pair of pipes entering said body near said conductor and terminating at longitudinally spaced regions in the interior of said body, said pipes providing means for introducing cooling fluid into said interior and discharging it therefrom.

2. An electrode holder comprising a tubular body of electrical conducting material having a closed end, means for removably holding an electrode in electrical contact with said body near said closed end, an electrical conductor inserted into the other end of said body, said conductor closing said other end and having electrical contact therewith, a pair of pipes entering said body through its side wall adjacent to said conductor contact, the outer end portions of said pipes being bent to lie parallel with said conductor and their inner ends terminating at different regions in the interior of said body, said pipes providing means for circulating cooling fluid through said interior, and an insulating handle surrounding the connections between said body and said conductor and pipes.

3. An electrode holder comprising a tubular body of electrical conducting material having a closed end, means for removably holding an electrode in electrical contact with said body near said closed end, an electrical conductor inserted into the other end of said body, said conductor closing said other end and having electrical contact therewith, a pipe entering said body near said conductor and extending interiorly thereof to a point near said closed end, said pipe forming means for introducing cooling fluid into the interior of said body, another fluid connection leading from said body near said conductor for discharging said cooling fluid, and an insulating handle surrounding said body, said handle also surrounding said fluid discharge connection.

HAROLD P. SANDERS.